United States Patent [19]

Fallah et al.

[11] Patent Number: 5,583,330
[45] Date of Patent: Dec. 10, 1996

[54] METHOD AND APPARATUS FOR THE CONTACT-FREE IDENTIFICATION OF ARTICLES HAVING A PROTECTIVE ENCLOSURE, WHEREIN THE ARTICLES ARE IDENTIFIED USING MULTIPLE ELECTROMAGNETIC WAVE TRANSMISSION/RECEPTION DEVICES

[75] Inventors: Michel Fallah, Carnoux en Provence; Jean-Christophe Fidalgo, Gemenos; Jean-Jacques Foglino, Peynier; Didier Serra, Marseilles; Jean-Claude Beaufils, Paris; Jérôme Van Straaten, Saint-Mande, all of France

[73] Assignee: Gemplus Card International, Gemenos, France

[21] Appl. No.: 371,551

[22] Filed: Jan. 11, 1995

[30] Foreign Application Priority Data

Jan. 11, 1994 [FR] France ................................. 94 00398

[51] Int. Cl.⁶ ..................................................... G06K 7/08
[52] U.S. Cl. ............................ 235/449; 235/375; 235/435; 235/491; 235/492
[58] Field of Search ...................................... 235/375, 435, 235/449, 491, 492; 336/117, 118, 119

[56] References Cited

U.S. PATENT DOCUMENTS 4,782,342  11/1988  Walton ..................................... 340/941
4,800,978   1/1989  Wasa et al. ......................... 336/119 X

FOREIGN PATENT DOCUMENTS

WO9313494  7/1993  France .
2077555  12/1981  United Kingdom .

*Primary Examiner*—Donald T. Hajec
*Assistant Examiner*—Michael G. Lee
*Attorney, Agent, or Firm*—Nilles & Nilles, S.C.

[57] ABSTRACT

The system has a reader of electronic labels comprising several devices for the transmission/reception of electromagnetic waves, offset angularly about a median axis so that, when the reader is placed in the vicinity of a label and irrespectively of their relative orientation, at least a part of the lines of the magnetic field generated by at least one of said transmission/reception devices can get looped by passing into the coil of the label in the direction of its axis. The label has a foil made of amagnetic and conductive material placed against the antenna and parallel to it to form a reflective screen for the electromagnetic waves. Application to the contact-free identification of objects, notably metal objects, such as gas cylinders.

18 Claims, 2 Drawing Sheets

METHOD AND APPARATUS FOR THE CONTACT-FREE IDENTIFICATION OF ARTICLES HAVING A PROTECTIVE ENCLOSURE, WHEREIN THE ARTICLES ARE IDENTIFIED USING MULTIPLE ELECTROMAGNETIC WAVE TRANSMISSION/RECEPTION DEVICES

BACKGROUND OF THE INVENTION

1. Field of the Invention

The present invention relates to a system for the contact-free or contactless identification of articles, notably metal articles such as, for example, gas cylinders or bottles.

2. Description of the Prior Art

A known way of locating and identifying such articles is to affix electronic labels to them. Such a label is provided with a device for the reception and transmission of electromagnetic waves coupled with an electronic module enabling the processing of the received signals and the re-transmission of other signals, comprising notably a message for the identification of the label, and hence of the article to which it is affixed. Furthermore, the system has an electromagnetic wave tranmission/reception or transceiver device to transmit information elements between a data terminal and said electronic label.

The reader fulfils several functions and is notably used to:

send the label the energy needed for its functioning, the label lacking any specific, independent energy source, send the label data elements coming from the terminal, it being possible for these data elements to be recorded, if necessary, in a memory with which the label is provided, receive data elements that come from the label and are specific to it, notably with a view to its identification.

To carry out these various transmissions, the transceiver device of the reader has an antenna constituted, for example, by a coil with a ferrite core used for transmission and reception.

The label also has an antenna to receive the electromagnetic waves transmitted by the reader, the same antenna being used also to transmit data elements to the reader. In reception, the antenna constitutes a means for the reception, by induction, of the energy coming from the reader as well as a means for the reception of the data elements sent out by this reader. The antenna is connected to an electronic circuit, for example an electronic "chip", comprising means necessary for the demodulation of the signals received by the antenna, their decoding and memorizing, as well the encoding and modulation of the signals to be re-transmitted.

A major problem of these systems is that of enabling the label to receive the energy needed for its operation with maximum efficiency so as to make it possible to reduce the power of the electromagnetic radiation sent out by the reader and limit the amount of space required by the antennas, and enable a transmission of energy and signals without being subjected to an excessively short distance of transmission.

To attempt a resolution of this problem, it has already been proposed to make a ferrite cylinder type of label antenna formed by a cylindrical ferrite piece comprising, on one of its plane faces, an annular groove in which a coil is housed. Such an antenna is necessarily fixed to the article to be identified with its axis perpendicular to the surface of the article and, owing to the relatively great height of the ferrite cylinder, has a cumbersome space requirement in the axial direction. A known way of overcoming this problem is to embed the label in the surface of the article. For example, there is a known way of placing labels of this type in a housing hollowed out in the button of the gas cylinder valve. Consequently, the antenna is necessarily small-sized.

The antenna of the reader is made similarly by means of a coil whose axis has to be placed substantially in the direction of the axis of the antenna of the label to provide for the best possible transmission of energy. For reasons of space availability, it is practically impossible to increase efficiency by means of the approach that consists in increasing the diametric size of the label in order to pick up more of the flux lines emitted by the reader. It has thus turned out to be the case that the distance between the reader and the label can hardly exceed 5 mm with such a system.

Another approach envisaged is that of making the antenna of the label in the form of a coil surrounding an elongated ferrite rod, for example 15 mm long and 3 mm wide.

In order that the flux lines of the magnetic field may pass into the ferrite rod in the axial direction of the coil, this coil should be substantially parallel to the surface of the article to which the label is affixed. A first drawback of this arrangement is that, in order to enable the transmission of energy and data between a reader of the above type and the label, the antenna of the reader should be oriented so as to have its axis oriented substantially in the axial direction of the coil of the antenna of the label. The result thereof is that it is impossible to read the label reliably without seeing to the relative orientation of this label with respect to the reader. Furthermore, it is necessary to place the label in a place where it is mechanically protected. In the case of gas cylinders, this is achieved by placing the label close to the valve, inside the protective bell or socket of the valve, in a plane substantially perpendicular to the axis of the cylinder. To ensure efficient transmission of energy between the reader and the antenna of the reader, the antenna of the reader would have to be placed in an axial alignment with the antenna of the label. This is practically impossible inside the bell for reasons of space requirements, and if the reader is placed outside the bell, the latter forms a shield that greatly disturbs the transmission.

Consequently, although labels with antennas of the ferrite rod type have certain advantages, notably as regards the amount of space required, they cannot be read by a reader reliably and easily when they are placed on many types of articles, notably gas cylinders.

SUMMARY OF THE INVENTION

The invention is aimed at overcoming the above problems and at enabling a reliable identification of articles provided with electronic labels while, at the same time, limiting the constraints related to the reading of these labels.

With these aims in view, an object of the invention is a system for the identification of articles bearing an electronic label, provided with an antenna for the reception and transmission of electromagnetic waves comprising coil having an axis, this system comprising a label reader, wherein said reader comprises several devices for the transmission/reception of said waves, each transmission/reception device of the reader comprising a magnetic circuit and means to generate a magnetic field in said magnetic circuit, said transmission-reception devices of the reader being offset angularly about a median axis so that, when the reader is placed in the vicinity of said label and irrespectively of their relative orientation, at least a part of the lines of the magnetic field generated by at least one of said transmission/reception devices can get looped by passing into the coil of the label in the direction of its axis.

Through the invention, it is possible to obtain a reliable reading of an electronic label comprising an antenna of the ferrite rod type, notably placed in parallel, against or in the vicinity of the surface of an article, without its being necessary to seek a particular orientation of the reader with respect to the label.

It thus becomes possible to read the label reliably, whatever its orientation. Indeed if, during the reading, the antenna of the label should, by chance, be oriented perpendicularly to the direction of the field defined by one of the transmission/reception devices, which would prevent the transmission of the flux through the coil, this transmission could all the same be obtained by another one of these devices since this other device, which is angularly offset, could at least partially transmit the flux through said coil of the label.

Preferably the system, in which the reader is associated with a data terminal, comprises automatic selection means to automatically switch over the supply from any first one of these devices to any second one of these devices when the data elements received by the terminal from said first device are considered to be not valid.

According to a particular arrangement, the magnetic circuit of each transmission/reception device has two bars whose respective ends constitute two poles spaced out with respect to each other by a distance such that at least a part of the lines of the magnetic field can get looped in the magnetic circuit by passing into the coil of the label, and the means to generate the magnetic field include two coils respectively wound on the two bars.

This arrangement has the advantage wherein, since the two coils are wound so as to create a magnetic flux from one coil to the other in passing through the coil of the label, the power transmitted and the sensitivity of reception are practically doubled.

Preferably then, the axes of the bars are substantially parallel, and said ends of the bars are located substantially in one and the same plane perpendicular to said axes.

This arrangement has the advantage of giving a compact reader that can easily be taken to the vicinity of the label to make a reading of this label, substantially perpendicularly to this label, especially even when protective means surround the label, as is the case for example for gas cylinders.

An object of the antenna is also an electronic label for an article identification system provided with such a label, comprising an electronic module coupled with an antenna for the reception and transmission of electromagnetic waves, said antenna comprising a coil having an axis and being wound about a ferrite rod elongated in the direction of this axis, wherein said label comprises a foil made of electrically conductive amagnetic (i.e., non-magnetic) metal alloy, and said antenna extends up to the direct vicinity of said foil, the axis of the coil being parallel to this foil. The label according to the invention is particularly suited to the system mentioned here above. Indeed, during the reading of a label comprising an antenna formed by a coil wound about a ferrite rod located in parallel to the surface of the article, the magnetic flux sent out by the reader passes partially beside the antenna, in forming a leakage flux, despite the flux-concentrating capacity of the rod. Depending on the nature of the material of the article, this leakage flux may be modified substantially, consequently disturbing the flux that flows into the ferrite rod. Thus, for example, if the article is made of a magnetic material, for example steel, a major part of the flux emitted will pass into this material to the detriment of the share of flux that goes through the ferrite of the label. Conversely, if the material of the article is non-magnetic, it acts as a reflector for the magnetic field, with the reflected field lines disturbing the emitted field, in the vicinity of the antenna, even risking the creation, by interference, of field nodes where this field gets cancelled. Consequently, the energy received by the label and the general behavior of this label are variable as a function of the constituent material of the article, thus giving rise to variations in reading conditions, and notably variations in the acceptable distance between the reader and the label.

The label according to the invention can be used to overcome this problem by making the behavior of the label independent of the nature of the support to which it is affixed, the foil of conductive material playing the role of a screen or shield that acts always in the same way, whatever the underlying material.

Other features and advantages of the invention shall appear from the following description, made by way of an example, of a system for the identification of gas cylinders and for the identification of a label for such cylinders, in accordance with the invention.

BRIEF DESCRIPTION OF THE DRAWINGS

Reference shall be made to the appended drawings, of which.

MORE DETAILED DESCRIPTION

Figure 1:
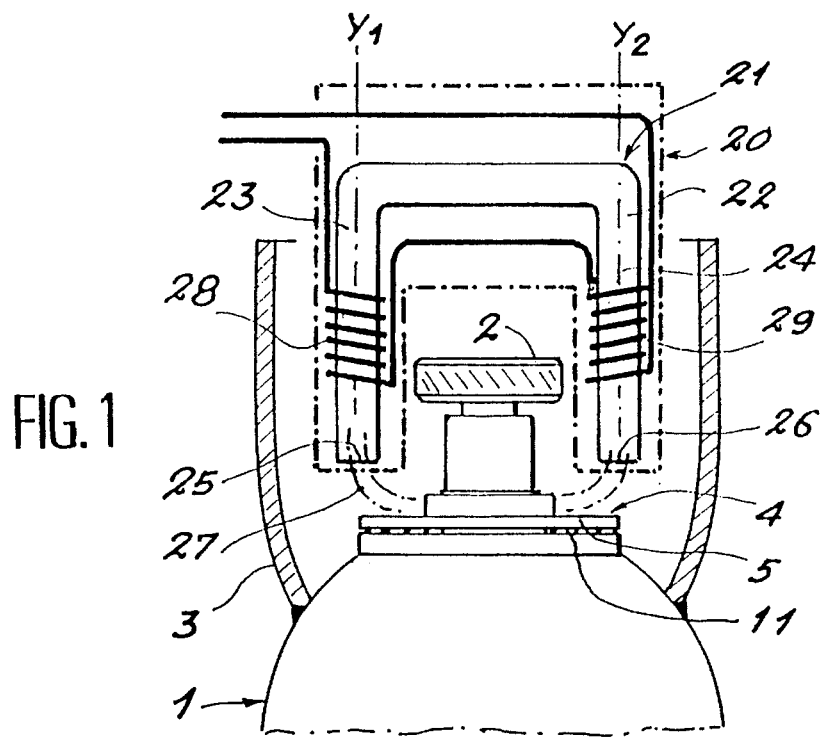
FIG. 1 gives a schematic view of the reader during the reading of a label affixed to a gas cylinder.

The drawing of FIG. 1 shows the upper part of a gas cylinder 1 comprising a valve 2 and a protective bell 3 surrounding the valve.

An electronic label 4 is placed at the bottom of the bell, against the wall 11 of the bottle 1.

Figure 2:
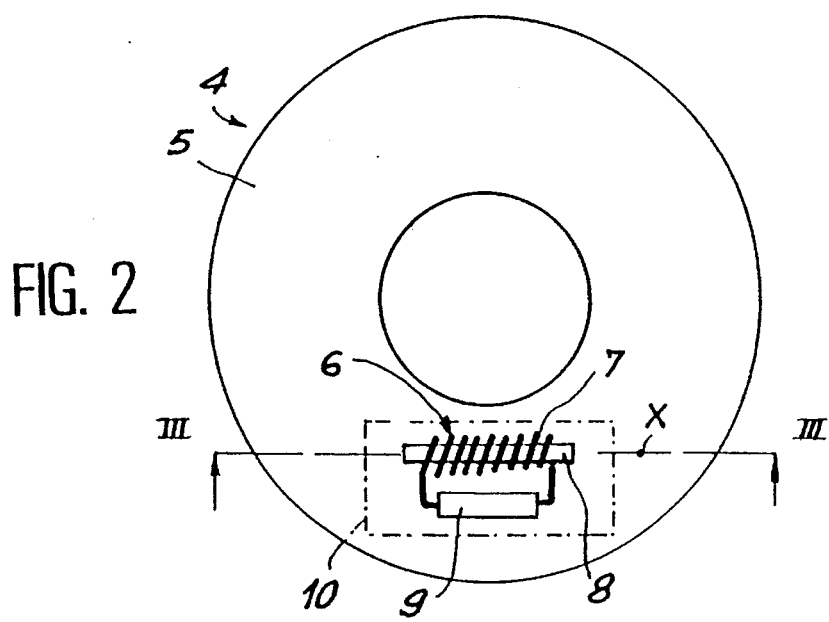
FIG. 2 shows a top view of the label.
Figure 3:
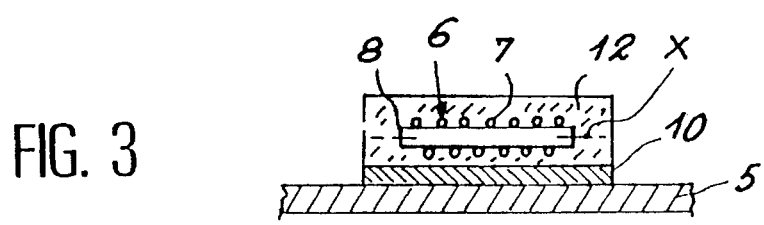
FIG. 3 is a sectional view along the line III—III of FIG. 2.

As can be seen more clearly in FIGS. 2 and 13, the label 4 has a flat plastic ring 5 that is fixed to the bottle and surrounds the connector of the valve 2. The label also has an electromagnetic wave transmission/reception antenna 6 formed by a coil 7 wound about a ferrite rod 8 extending along an axis X and coupled with an electronic module 9 such as an integrated circuit chip of a known type to provide for the identification of the label. The antenna extends, along the axial direction X of the rod, in parallel to the surface of the ring 5 and hence substantially in parallel to the surface of the wall 11 of the cylinder and along a direction tangential with respect to said ring. A foil 10 made of an amagnetic (i.e., non-magnetic) material and having low electrical resistivity is interposed between the antenna 6 and the ring 5.

The set constituted by the antenna 6 and, possibly, the foil 10, is preferably sheathed by or encapsulated in an insulator material 12, for example a plastic material, to form a protection of the antenna.

The foil 10 is, for example, made of copper or copper alloy and extends preferably beyond the ends of the ferrite rod 8. As shall be understood more clearly hereinafter in the description, this foil has the role of forming a reflective screen or shield for the radiofrequency waves conveyed by the magnetic flux generated by the reader during the reading of the label or during the writing in this label. It is desirable to reduce this thickness to the greatest possible extent to limit the amount of space taken up by the label. However, the thickness should be at least equal to the skin thickness of the amagnetic material at the frequency considered so that the effect of this metal layer may be significant. The skin thickness is defined as the thickness of metal ensuring electrical conduction at a given frequency. The foil could be formed, in particular, by a metallization of the ring or, in other applications, of the support of the antenna obtained by a known type of method for the vacuum deposition of said amagnetic metal alloy, or by any other technique of deposition such as electrolytic deposition, chemical deposition or by lamination or pasting of a metal foil.

The drawing of FIG. 1 also shows an electromagnetic wave transmission/reception device 21 of a reader 20, shown schematically and having its shape adapted to penetrate the interior of the protective bell 3. The transmission/reception device has means to generate a magnetic field in a magnetic circuit, formed by a part 22 made of magnetic material. This part 22 is, for example, U-shaped comprising two bars forming the arms 23, 24 of the "U" whose ends form two poles 25, 26 having axial directions Y1, Y2 that are substantially parallel and located in one and the same plane substantially parallel to said axial directions. The two poles 25, 26 are spaced out by a distance such that the lines 27 of the magnetic field going into the magnetic circuit get looped in passing into the ferrite rod 8 when the reader is close to the label. The ferrite rod will thus participate in the closing of the magnetic circuit and, by having an effect of concentration of the field lines, will optimize the flux going through the coil 7 of the label.

Said means for the generation of the magnetic field are preferably constituted by two coils 28, 29 wound about arms 23, 24 in a direction adapted so that the flux goes round in the magnetic circuit, i.e. such that the field generated by each of the coils in the respective arms is in the opposite direction.

During the reading of a label, in placing the reader near this label, the field lines tend to be channelled by the ferrite rod 8. However, a part of these lines gets dispersed and there is therefore a leakage flux that is lost. This phenomenon may be all the more accentuated with the reader according to the invention as the arrangement of the poles tends to prompt a spreading out of the field lines between these poles.

The density of the leakage flow is variable firstly as a function of the relative position of the reader and of the label and, secondly, of the nature of the neighboring materials. Thus, for example, in the vicinity of a magnetic metal mass such as that of a steel bottle or cylinder, the leakage flux drained through this mass and consumed by its magnetization will bring about a reduction, to a corresponding degree, of the useful flux flowing through the coil of the receiver. By contrast, if the metal mass is amagnetic, for example if it is an aluminium cylinder, the magnetic field is reflected.

This is why the label according to the invention comprises the non-magnetic conductive metal foil that forms a shield and reflects the field and therefore homogenizes the conditions of transmission and reception irrespectively of the nature of the material of the article to which the label is affixed.

It has thus been observed that, in the absence of the foil 10, the tuning frequency of the resonant circuit forming the antenna, constituted by the coil 7 and by a tuning capacitor, could vary by more than 10% in making the antenna approach a surface made of amagnetic material whereas, with the label according to the invention, this variation is only of the order of 1%.

Figure 4:
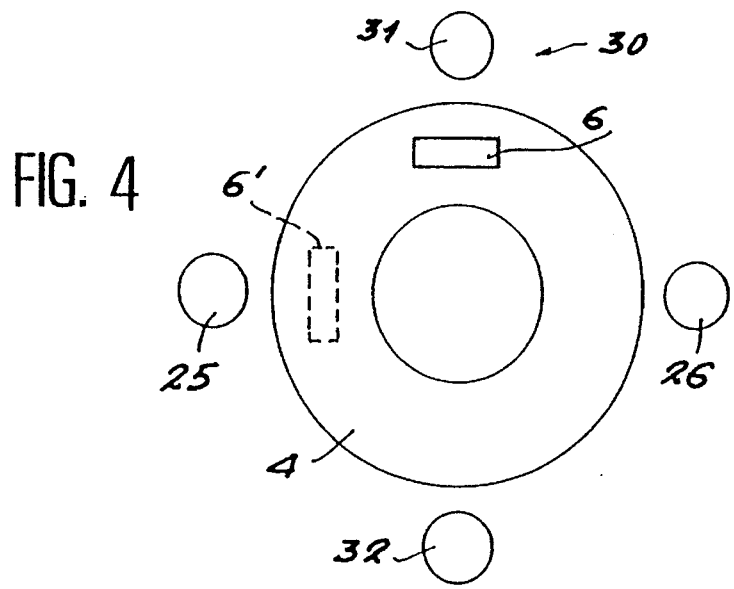
FIG. 4 is a diagram showing the principle of a particular arrangement of the coils of the reader, in the case of a reader having two transmission/reception devices.

If the reader were to comprise only one transmission/reception device then, during the reading, the relative orientation of the poles 25, 26 and of the antenna 6 of the label could be such that the flux crossing the coil 7 of the label would be insufficient when, as shown by means of a box of dashes 6' in FIG. 4, the axial direction X of said antenna is perpendicular to the plane containing said poles. It would then be necessary to change this orientation to enable its reading. To avoid this problem, the reader has a second transmission/reception device 30, constituted like the device 21 shown in FIG. 1 and offset angularly with respect to the first device about the median axis A of the poles, so that the plane of the poles 31, 32 of the second device is, as a non-restrictive example, perpendicular to the plane of the first device. Thus, irrespectively of the relative position of the reader and of the antenna, the reading may be done by at least one of the devices.

It will easily be understood that the reading could be made even more reliable in any position through the use of more than two transmission/reception devices distributed in different angular positions so as to cover the different orientations that may be taken by the antenna of the label.

Figure 5:
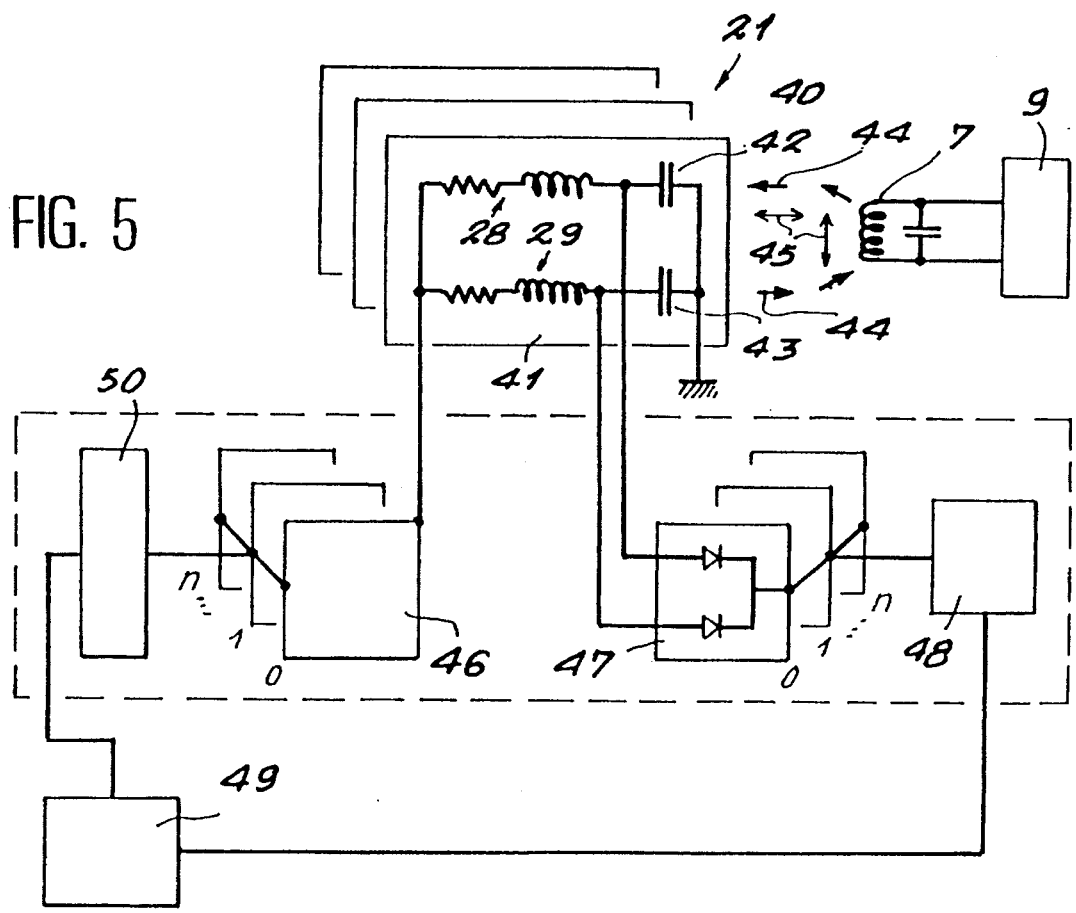
FIG. 5 is an electrical diagram of the reader when it has several switchable transmission/reception devices.

The drawing of FIG. 5 shows a simplified block diagram of the reader comprising a plurality, such as this, of transmission/reception devices and means for the automatic selection, from among these devices, of that device which enables a reliable reading of the label.

This diagram shows several transmission/reception devices 21, referenced 0, 1 . . . n, each comprising two parallel-connected resonant circuits 40, 41 respectively comprising the coils 28, 29 associated with capacitors 42, 43. The bold arrows 44 symbolically represent the transmission of the energy needed for the functioning of the electronic label. The double arrows 45 similarly represent the data exchanges between the reader and the label, by the modulation of the electromagnetic waves transmitted.

Each transmission-reception device 21 is connected to a power and modulation stage 46 and to a demodulation stage 47. The outputs of the demodulation stages 47 are connected together to filters 48, from which the signals corresponding to the data elements read are transmitted to a data terminal 49.

The inputs of the power and modulation stages 44 are connected to a selector 50 that supplies them selectively and is itself connected to the terminal 49. When, during a reading operation, the data elements transmitted to the terminal and coming from the signals picked up by one of the devices 21 are not valid, notably because the antenna of the label is not accurately oriented with respect to said device 21, the terminal sends a pulse to the selector 50 which then switches over to supply another power and modulation stage and therefore to put another transmission/reception device into service. These operations are renewed until the reading of the label is validated.

The invention is not limited to the arrangements that are described here above purely by way of an example. In particular, the label may be made in a shape different from the annular shape described here above and may comprise, instead of the ring 5, a simple plate, made of plastic for example, forming a layer of insulating material placed against the foil made of amagnetic conductive material, on its side opposite the antenna. This plate is used as a support for the antenna and the electronic module. In particular, this plate, while retaining a general annular shape, may be discontinuous, for example with a "C" shape. This may make it easy to place it on the cylinder around the valve. It may also have any other shape suited to the article to which the label has to be affixed. The label may be affixed to any article, said plate furthermore enabling the electrical insulation of the foil of amagnetic conductive material from the article, notably when the article is made of metal.

Again, the magnetic circuit of each transmission-reception device may be shaped differently from the way in which it has been described here above, the above description having been given solely by way of an example. In particular, it is possible that the axes of the bars may be not parallel. For example, they may be inclined with respect to one another, or even substantially coaxial, with the end faces of the bars pointing to one another should there be no problems of space requirement in the vicinity of the labels. Said faces of the bars could, even in the case of parallel bars, be not coplanar but inclined with respect to one another.

What is claimed is:

1. A system for the identification of an object closed by a valve surrounded by a protective bell, the system comprising:

a layer of insulator material placed at the bottom of said protective bell;

an electronic label including an antenna for the reception and transmission of electromagnetic waves, said antenna further comprising a coil having an axis and being wound on a ferrite rod, said antenna being fixed to said layer of insulator material, said antenna thereby being adjacent to said bottom surface of said protective bell, and said axis of said antenna being substantially parallel to said bottom surface of said protective bell, and an electronic module coupled to said antenna: and a label reader, said label reader being inserted into said protective bell and further comprising several devices for the transmission/reception of said electromagnetic waves, each transmission/reception device of said label reader comprising a magnetic circuit and means for generating a magnetic field in said magnetic circuit, said transmission-reception devices of said label reader being offset angularly about a median axis so that, when the reader is placed in the vicinity of said electronic label and irrespectively of their relative orientation, at least a part of the lines of the magnetic field generated by at least one of said transmission/reception devices can get looped by passing into said coil of said label in the direction of said axis of said coil.

2. A system according to claim 1, wherein said magnetic circuit of each said transmission/reception device has two bars whose respective ends constitute two poles spaced out with respect to each other by a distance such that at least a part of the lines of said magnetic field can get looped in said magnetic circuit by passing into said coil of said label, and wherein said means for generating said magnetic field includes two coils respectively wound on said two bars in a configuration such that the field generated has opposite directions in said two bars.

3. A system according to claim 2, wherein said two bars have substantially parallel axes and said ends of said two bars are located substantially in one and the same plane perpendicular to said axes.

4. A system according to claim 1, further comprising a data terminal associated with said label reader, and automatic selection means for automatically switching over the supply from any first one of said transmission/reception devices to any second one of said transmission/reception devices when the data elements received by said data terminal from said first device are considered to be not valid.

5. An electronic label for an article identification system provided with such a label, the electronic label comprising:

an electronic module coupled with an antenna for the reception and transmission of electromagnetic waves, said antenna comprising a coil having an axis and being wound about a ferrite rod elongated in the direction of said axis, a foil made of electrically conductive non-magnetic metal alloy, and wherein said antenna extends up to the direct vicinity of said foil, said axis of said coil being parallel to said foil.

6. A label according to claim 5, wherein said foil is a copper alloy.

7. A label according to claim 5, further comprising a layer of insulator material placed against said foil, on a face of said foil opposite said antenna.

8. A label according to claim 7, wherein said foil is made formed by a metallization of the surface of said layer of insulator material through the vacuum deposition of said alloy.

9. A system according to claim 7, wherein said layer of insulator material is constituted by a plate made of plastic.

10. A system for the identification of an object closed by a valve surrounded by a protective bell, the system comprising an electronic label including a layer of insulator material placed at the bottom of said bell around said valve, an antenna for the reception and transmission of electromagnetic waves, said antenna further comprising a coil having an axis and being wound on a ferrite rod. and said antenna being fixed to said layer of insulator material parallel to the surface of said layer, an electronic module associated with said antenna, and a foil made of a non-magnetic metallic material fixed to said layer of insulator material and interposed between said antenna and the surface of said object; and a label reader, said label reader further comprising several devices for the transmission/reception of said electromagnetic waves, each transmission/reception device of said label reader comprising a magnetic circuit and means for generating a magnetic field in said magnetic circuit, said transmission-reception devices of said label reader being offset angularly about a median axis so that, when the reader is placed in the vicinity of said electronic label and irrespectively of their relative orientation, at least a part of the lines of the magnetic field generated by at least one of said transmission/reception devices can get looped by passing into said coil of said label in the direction of said axis of said coil.

11. A system according to claim 10, wherein said foil made of non-magnetic metallic material is interposed between said antenna and said layer of insulator material.

12. A system according to claim 10, wherein said layer of insulator material is formed by a flat ring made of plastic.

13. A method of identifying an object which is at least partially surrounded by a protective enclosure, the method comprising the steps of:

providing said object with an electronic label, said electronic label having an antenna for the reception and transmission of electromagnetic waves, said antenna further comprising a coil having a coil axis and being wound on a ferrite rod, said providing step including the step of placing said antenna on an inner surface of said protective enclosure;

inserting a label reader into said protective enclosure, said label reader comprising first and second transmission/reception devices;

generating first and second magnetic fields, said generating step including the steps of
generating said first magnetic field with said first transmission/reception device, and
generating said second magnetic field with said second transmission/reception device;

angularly offsetting said first magnetic field from said second magnetic field, said first and second magnetic fields being angularly offset about a median axis, said median axis being generally perpendicular to said coil axis; and reading data elements stored in said electronic label, said reading step occurring in response to said first and second magnetic fields generating step.

14. A method according to claim 13, wherein said protective enclosure is a protective bell, and wherein during said placing step said antenna is placed at the bottom of said protective bell such that said coil axis is substantially parallel to said bottom of said protective bell.

15. A method according to claim 13, further comprising the step of automatically selecting between said first and second transmission/reception devices, said automatically selecting step including the steps of determining that said first magnetic field is improperly oriented with respect to said antenna; and switching over power from said first transmission/reception device to said second transmission/reception device in response to said determining step.

16. A method according to claim 13, further comprising the steps of interposing a layer of insulator material between said antenna and said protective enclosure; and interposing a foil made of non-magnetic material between said antenna and said layer of insulator material.

17. A method according to claim 16, further comprising the step of vacuum depositing an electrically conductive non-magnetic alloy so as to form said foil.

18. A method according to claim 13, wherein said first transmission devices has first and second bars, and further comprising the step of winding first and second coils on said first and second bars, respectively, such that the magnetic field generated in said first bar is in an opposite direction as the magnetic field generated in said second bar.

* * * * *